United States Patent [19]

Son et al.

[11] Patent Number: 4,526,693
[45] Date of Patent: Jul. 2, 1985

[54] SHALE AND SALT STABILIZING DRILLING FLUID

[75] Inventors: Adelina J. Son; Vernon S. Neal; Christopher M. Garvey, all of Houston, Tex.

[73] Assignees: Halliburton Co., Duncan, Okla.; TXP Operating Co., Houston, Tex.

[21] Appl. No.: 495,011

[22] Filed: May 16, 1983

[51] Int. Cl.³ .......................... C09K 7/02; C09K 7/04
[52] U.S. Cl. .................. 252/8.5 B; 175/65; 252/8.5 A
[58] Field of Search .............. 252/8.5 A, 8.5 B, 363.5; 166/292; 175/65

[56] References Cited

U.S. PATENT DOCUMENTS

| | | | |
|---|---|---|---|
| 3,396,105 | 8/1968 | Burdyn et al. | 252/8.5 C |
| 3,479,287 | 11/1969 | Floyd et al. | 252/8.5 A |
| 3,720,610 | 3/1973 | Erasmus | 252/8.5 C |
| 3,723,311 | 3/1973 | Lummus et al. | 252/8.5 A |
| 3,850,817 | 11/1974 | Barthel | 252/8.5 A |
| 3,882,029 | 5/1975 | Fischer et al. | 252/8.55 R |
| 3,896,031 | 7/1975 | Carney | 252/8.5 C |
| 3,948,782 | 4/1976 | Dreher et al. | 252/8.5 C |
| 3,985,659 | 10/1976 | Felicetta et al. | 252/8.5 A |
| 3,989,632 | 11/1976 | Fischer et al. | 252/8.5 A |
| 4,012,329 | 3/1977 | Hayes et al. | 252/8.5 P |
| 4,046,197 | 9/1977 | Gruesbeck, Jr. et al. | 166/305 R |
| 4,175,042 | 11/1979 | Mondshine | 252/8.55 R |
| 4,192,753 | 3/1980 | Pye et al. | 252/8.5 A |
| 4,357,245 | 11/1982 | Engelhardt et al. | 252/8.5 C |

Primary Examiner—Stephen J. Lechert, Jr.
Assistant Examiner—Howard J. Locker
Attorney, Agent, or Firm—Robert A. Kent; Thomas R. Weaver

[57] ABSTRACT

The invention relates to a clay based aqueous drilling fluid containing dissolved inorganic salts for use in drilling through either or both shale and salt formations. The fluid is prepared by dissolving designated quantities of ammonium chloride and sodium chloride in the aqueous fluid prior to admixing of the clay and other additives.

7 Claims, No Drawings

SHALE AND SALT STABILIZING DRILLING FLUID

BACKGROUND OF THE INVENTION

1. Field of the Invention

The present invention relates to a shale and salt formation stabilizing drilling fluid comprising an aqueous fluid containing dissolved salts.

2. Prior Art

Drilling of salt and shale formations are very old problems. Numerous methods have been developed which facilitate such drilling, however, many of the methods employ expensive additives or fluids which are environmentally undesirable. The use of saturated salt solutions to prevent enlargement of a borehole by preventing dissolution of the drilled salt is known.

Water-sensitive shales contain various amounts of clay minerals. The clay mineral components may be highly swelling montmorillonite or less water-sensitive kaolinite or chlorite. Generally, shales appear to swell to some extent when contacted by fresh water. The uptake of water by shales has two effects: a volume change as a result of swelling and a strength reduction as the water content increases. This may result in flow of the shale into the well bore or spalling of hard shale, both of which restrict the well bore.

The most successful method of controlling water-sensitive shales uses oil-base drilling fluids. High initial cost and environmental restrictions prevent the use of oil-base drilling fluids in many areas in which shale may be encountered. In this event, water-base drilling fluids are treated to minimize the destabilizing effect of the drilling fluid.

In U.S. Pat. No. 3,017,351, a method for drilling through shale is disclosed. In accordance with that method, water-soluble ammonium and potassium salts are admixed with a water-soluble amine and an acrylamide polymer hydrolyte to provide a drilling fluid that helps prevent clay swelling and softening and also prevent breaking of the shale by mechanical action. The use of such combinations in a clay-based drilling fluid, however, is not practiced because the inorganic salts present would flocculate the clays being used for viscosity and fluid-loss control as disclosed in U.S. Pat. No. 4,142,595.

It is not uncommon to encounter successive salt and shale formations while drilling a well. Conventional practice is to use a drilling fluid which is highly inhibitive to the clay in the shale and then rapidly drill through the salt formation or break over the drilling fluid to a saturated salt system.

It would be desirable to provide a method by which salt and shale formations can be stabilized during drilling with a clay-containing drilling fluid.

SUMMARY OF THE INVENTION

The present invention relates to a composition and method of preparing a novel clay-based aqueous or emulsion drilling fluid containing dissolved inorganic salts for use in shale and salt formations. The method of the present invention avoids flocculation of the clays being used for viscosity control in the fluid and permits preparation of a desired viscosity fluid without the occurrence of viscosity humps in the formation of the fluid.

The fluid is prepared by admixing from 10 to 70 pounds per barrel (hereinafter "ppb") of ammonium chloride with an aqueous fluid until the ammonium compound substantially is dissolved. Then, 65 to 150 ppb of sodium chloride is admixed with the aqueous fluid. A viscosifying agent comprising a clay such as bentonite, sepiolite or the like then is admixed with the fluid. Fluid-loss reducers, pH control agents, weighting agents and the like then can be added to the fluid to form a drilling fluid having a final pH in the range of from about 5 to 9. A hydrocarbon fluid such as diesel also can be admixed with the drilling fluid if a lower weight fluid is desired. The drilling fluid can be formulated to have a weight in the range of from about 8.5 to about 18 pounds per gallon.

DESCRIPTION OF THE PREFERRED EMBODIMENT

The present invention provides a method for preparing a unique drilling fluid composition comprising a clay-based aqueous drilling fluid. The composition can be used in drilling of salt and shale formations and is particularly useful in drilling of gumbo and similar shales. The drilling fluid exhibits significant tolerance to contamination by materials such as cement, drill solids, magnesium salts and the like while providing acceptable fluid properties.

The drilling fluid of the present invention is prepared by admixing from about 10 to about 70 ppb of ammonium chloride with an aqueous fluid until a substantial portion of the ammonium chloride dissolves. The aqueous fluid can comprise fresh water, formation water, brine or the like. Preferably, the aqueous fluid comprises fresh water. A quantity of from about 65 to about 150 ppb of sodium chloride then is admixed with the aqueous fluid. The quantity of sodium chloride necessary to saturate the fluid at the existing aqueous fluid temperature dissolves and the remainder remains suspended in the fluid. The undissolved remainder will provide salt necessary to saturate the aqueous fluid at higher temperature levels which may occur during use of the aqueous fluid in drilling operations. In instances in which the aqueous fluid comprises a brine, lesser quantities of sodium chloride will be required to provide a total concentration in the designated range.

Upon dissolution of a substantial portion of the salts, a viscosifying agent comprising prehydrated bentonite, attapulgite, sepiolite or the like is admixed with the aqueous solution. Sufficient viscosifying agent is admixed with the aqueous solution to provide a concentration of from about 5 to about 30 ppb of the drilling fluid. While the viscosifying agent provides some fluid-loss control, it is desirable to admix a selected fluid-loss control agent with the fluid to enhance the rheological properties of the fluid. The fluid-loss control agent comprises a polymer such as, for example, a cellulose derivative such as carboxymethylcellulose, a starch, a vinylamide/vinylsulfonate polymer or the like. The fluid-loss control agent generally is admixed with the fluid in an amount in the range of from about zero to about 10 ppb. The fluid also can be admixed with a quantity of diesel oil or the like to form an emulsion which also functions to reduce fluid loss. If a quantity of a hydrocarbon is admixed with the aqueous drilling fluid, the hydrocarbon can be present in an amount of from about 0 to about 30 percent of the total fluid volume.

Preferably, a pH control and rheology stabilizing agent is admixed with the drilling fluid, however, such agent is not required by the composition of the present invention. The preferred pH-control and rheology-control agent is ferrous gluconate. The ferrous gluconate buffers the pH of the fluid against rapid pH change over a wide pH range and stabilizes the fluid by reducing the possibility of free ammonia generation as a result of pH excursions. The ferrous gluconate also provides some corrosion protection to the well bore tubular goods by complexing any hydrogen sulfide present in the drilling fluid. The ferrous gluconate generally is admixed with the fluid in an amount of from about zero to about 10 ppb.

The pH of the drilling fluid is adjusted to provide a pH in the range of from about 5.0 to 9.0 and, preferably, from about 7.0 to 9.0. The pH adjustment normally is accomplished by the addition of an alkaline agent such as sodium hydroxide or the like. The presence of ferrous gluconate in the drilling fluid effectively neutralizes any increased potential for corrosion which results from the slightly acid pH range of the fluid. At a pH in excess of 9.5, free ammonia gas can be liberated from the drilling fluid. This is undesirable because it will result in a substantial change in the rheological properties of the drilling fluid and is potentially hazardous to any personnel exposed to the gas.

A corrosion agent also can be admixed with the drilling fluid to provide additional corrosion protection. The corrosion agent can comprise a quaternary amine salt such as, for example, an alkylbenzyl pyridine quat, alkylpolyoxyethylenebenzylammonium chloride, imidazoline complexes with fatty acids or the like compounds which are well known to individuals skilled in the art.

A weighting agent then is admixed with the drilling fluid in an amount sufficient to produce a fluid having a weight in the range of from about 8.5 to about 18 pounds per gallon. The weighting agent can comprise barite, iron oxide such as hematite, galena, siderite or any other material which is capable of weighting a drilling fluid.

Conventional rotary drilling techniques are employed in the process of using the novel drilling fluid of the present invention. One technique involves pumping the drilling fluid down the well bore through a drill pipe and discharge of the fluid from the drill bit against the bottom of the well bore. The drilling fluid picks up and carries the cuttings through an annular space surrounding the pipe to the surface where various equipment well-known to individuals skilled in the art separate the cuttings from the drilling fluid. If desired, reverse circulation of the drilling fluid can be employed. It is contemplated that the drill fluid of the present invention can be used in any conventional circulation process employed in drilling operations.

The drilling fluid of the present invention can be used in wells in which the fluid is heated to a temperature of up to about 325° F. during the drilling operation.

To further illustrate the beneficial aspects of the method of the present invention, and not by way of limitation, the following examples are provided.

EXAMPLE I

To illustrate the effect the mixing order of the components of the drilling fluid has upon the rheological properties of the fluid, the following tests are performed. In the tests, the components are admixed in a high-shear mixer with a quantity of fresh water in the order and at the rates designated.

| Test 1 | |
| --- | --- |
| Component | ppb |
| Sepiolite | 15 |
| Ferrous gluconate | 2 |
| Sodium hydroxide | 0.25 |
| Quarternary amine salt | 1 |
| Polyanionic cellulose derivative | 2 |
| NaCl | 93 |
| $NH_4Cl$ | 13 |

| Test 2 (Admixed in accordance with the method of the present invention.) | |
| --- | --- |
| Component | ppb |
| $NH_4Cl$ | 13 |
| NaCl | 93 |
| Polyanionic cellulose derivative | 2 |
| Sepiolite | 15 |
| Ferrous gluconate | 2 |
| Sodium hydroxide | 0.25 |
| Quarternary amine salt | 1 |

The initial rheological properties of the fluids are as follows:

| Rheology at 80° F. | Test 1 | Test 2 |
| --- | --- | --- |
| 600 rpm | 61 | 52 |
| 300 rpm | 42 | 32 |
| Plastic viscosity, cp | 19 | 20 |
| Yield point, #/100 ft.$^2$ | 23 | 12 |
| Gel strength | | |
| 10 sec., #/100 ft.$^2$ | 1 | 6 |
| 10 min., #/100 ft.$^2$ | 27 | 3 |
| Fluid pH | 6.9 | 6.9 |
| API filtrate, ml.[1] | 22 | 13 |

[1]Determined in accordance with API RP 13B Standard Procedure for Testing Drilling Fluids The practice of the method of the present invention produces a drilling fluid having desirable rheological properties without the occurrence of a viscosity hump during the mixing process. The method of Test 1 results in the occurrence of a severe viscosity hump during the mixing procedure. Practice of the present invention permits a fluid to be prepared having a predetermined viscosity without the necessity of dilution of the drilling fluid to lower the viscosity to the desired level as often is necessary when viscosity humps occur in preparing fluids.

Such dilution is highly disadvantageous in that additional quantities of the additives for fluid loss, pH control, weighting and the like then must be added to the drilling fluid to adjust the concentration of the additives in the diluted fluid.

EXAMPLE II

To illustrate the effects various contaminants have upon the drilling fluid of the present invention and the ability of the fluid to be reconditioned, the contaminants hereinafter defined are added to samples of the drilling fluid. The contaminants comprised:
1. 5 ppb gypsum
2. 5% by weight green cement
3. 10 ppb gumbo shale
4. 40 ppb gumbo shale
5. 80 ppb gumbo shale
6. 10% by volume water 7. 15% by volume brine having salt concentration of 70% NaCl, 15% $CaCl_2$ and 15% $MgCl_2$ The contaminated samples are hot rolled for 16 hours at 150° F., cooled to approximately 120° F. and rheological properties then are determined. The samples then are reconditioned by the addition of the designated compounds and hot rolled at 150° F. for 72 hours. The reconditioned samples then are cooled to about 120° F. and rheological properties are determined.

The basic drilling fluid comprised:

|  | ppb |
|---|---|
| $NH_4Cl$ | 13 |
| NaCl | 93 |
| Polyanionic cellulose derivative | 2.5 |
| Sepiolite | 15 |
| Ferrous gluconate | 2 |
| Sodium hydroxide | 0.5 |
| Quarternary amine salt | 0.5 |

The fluid is weighted by the addition of barite to 14 pounds per gallon.

Rheological Properties of Basic Drilling Fluid

|  | Initial | Hot Rolled | Reconditioned Hot Rolled[1] |
|---|---|---|---|
| 600 rpm @ 120° F. | 83 | 35 | 40 |
| 300 rpm @ 120° F. | 51 | 20 | 20 |
| Plastic viscosity (PV), cp | 32 | 15 | 20 |
| Yield point (YP) #/100 ft$^2$ | 19 | 5 | 0 |
| Gel Strength |  |  |  |
| 10 sec., #/100 ft$^2$ | 3 | 1 | 1 |
| 10 min., #/100 ft$^2$ | 5 | 2 | 3 |
| pH | 7.3 | 7.4 | 7.4 |
| API filtrate, ml. | 13 | 25 | 5 |

[1]Reconditioned by addition of 1 ppb polyanionic cellulose derivative and 3 ppb pregelatinized starch.

The rheological properties of the contaminated drilling fluids are as follows:

| Contaminant (5 ppb gypsum) | Hot Rolled (16 hrs., 150° F.) | Reconditioned Hot Rolled[1] (72 hrs., 150° F.) |
|---|---|---|
| 600 rpm | 35 | 34 |
| 300 rpm | 20 | 18 |
| PV, cp | 15 | 16 |
| YP, #/100 ft$^2$ | 5 | 2 |
| Gel strength |  |  |
| 10 sec., #/100 ft$^2$ | 1 | 1 |
| 10 min., #/100 ft$^2$ | 2 | 1 |
| pH | 7.0 | 7.2 |
| API filtrate, ml. | 28 | 5 |

[1]Reconditioned by addition of 1 ppb polyanionic cellulose derivative and 3 ppb pregelatinized starch.

| Contaminant (5% green cement) | Hot Rolled (16 hrs., 150° F.) | Reconditioned Hot Rolled[1] (72 hrs., 150° F.) |
|---|---|---|
| 600 rpm | 20 | 26 |
| 300 rpm | 10 | 13 |
| PV, cp | 10 | 13 |
| YP, #/100 ft$^2$ | 0 | 0 |
| Gel strength |  |  |
| 10 sec., #/100 ft$^2$ | 0 | 0 |
| 10 min., #/100 ft$^2$ | 4 | 1 |
| pH | 8.9 | 8.2 |
| API filtrate, ml. | no control | 6 |

[1]Reconditioned by addition of 1 ppb polyanionic cellulose derivative, 3 ppb pregelatinized starch, 2 ppb bicarbonate and 1 ppb Ferrous gluconate.

| Contaminant (10 ppb Gumbo) | Hot Rolled (16 hrs., 150° F.) | Reconditioned Hot Rolled[1] (72 hrs., 150° F.) |
|---|---|---|
| 600 rpm | 45 | 33 |
| 300 rpm | 23 | 17 |
| PV, cp | 22 | 16 |
| YP, #/100 ft$^2$ | 1 | 1 |
| Gel strength |  |  |
| 10 sec., #/100 ft$^2$ | 1 | 1 |
| 10 min., #/100 ft$^2$ | 1 | 1 |
| pH | 7.2 | 7.1 |
| API filtrate, ml. | 30 | 8 |

[1]Reconditioned by addition of 1 ppb polyanionic cellulose derivative and 3 ppb pregelatinized starch

| Contaminant (40 ppb Gumbo) | Hot Rolled (16 hrs., 150° F.) | Reconditioned Hot Rolled[1] (72 hrs., 150° F.) |
|---|---|---|
| 600 rpm | 43 | 26 |
| 300 rpm | 24 | 13 |
| PV, cp | 19 | 13 |
| YP, #/100 ft$^2$ | 5 | 0 |
| Gel strength |  |  |
| 10 sec., #/100 ft$^2$ | 1 | 1 |
| 10 min., #/100 ft$^2$ | 3 | 4 |
| pH | 7.1 | 7.0 |
| API filtrate, ml. | 50 | 36 |

[1]Reconditioned by addition of 1 ppb polyanionic cellulose derivative and 3 ppb pregelatinized starch

| Contaminant (80 ppb Gumbo) | Hot Rolled (16 hrs., 150° F.) | Reconditioned Hot Rolled[1] (72 hrs., 150° F.) (A) | (B) |
|---|---|---|---|
| 600 rpm | 63 | 134 | 76 |
| 300 rpm | 40 | 82 | 45 |
| PV, cp | 23 | 52 | 31 |
| YP, #/100 ft$^2$ | 17 | 30 | 14 |
| Gel strength |  |  |  |
| 10 sec., #/100 ft$^2$ | 4 | 3 | 2 |
| 10 min., #/100 ft$^2$ | 17 | 12 | 10 |
| pH | 6.9 | 7.5 | 7.0 |
| API filtrate, ml. | 70 | 5.5 | 5.3 |

[1](a)Reconditioned by addition of 1 ppb polyanionic cellulose derivative, 3 ppb pregelatinized starch and 3 ppb bicarbonate
(b)All of additives of (a) and 10 ppb $NH_4Cl$, 0.75 ppb Ferrous gluconate and 7% by volume saturated salt brine

| Contaminant (10% Volume water) | Hot Rolled (16 hrs., 150° F.) | Reconditioned Hot Rolled[1] (72 hrs., 150° F.) |
|---|---|---|
| 600 rpm | 31 | 31 |
| 300 rpm | 17 | 16 |
| PV, cp | 14 | 15 |
| YP, #/100 ft$^2$ | 3 | 1 |
| Gel strength |  |  |
| 10 sec., #/100 ft$^2$ | 1 | 1 |
| 10 min., #/100 ft$^2$ | 1 | 2 |
| pH | 7.4 | 7.3 |
| API filtrate, ml. | 24 | 6.0 |

[1]Reconditioned by addition of 1 ppb polyanionic cellulose derivative, 3 ppb pregelatinized starch, 2 ppb $NH_4Cl$ and 10 ppb NaCl

| Contaminant (15% Volume Brine) | Hot Rolled (16 hrs., 150° F.) | Reconditioned Hot Rolled[1] (72 hrs., 150° F.) |
|---|---|---|
| 600 rpm | 25 | 63 |
| 300 rpm | 13 | 35 |
| PV, cp | 12 | 28 |
| YP, #/100 ft$^2$ | 1 | 7 |
| Gel strength |  |  |
| 10 sec., #/100 ft$^2$ | 1 | 2 |
| 10 min., #/100 ft$^2$ | 1 | 3 |
| pH | 7.0 | 7.3 |
| API filtrate, ml. | 50 | 5.0 |

[1]Reconditioned by addition of 1 ppb polyanionic cellulose derivative, 3 ppb pregelatinized starch and 5 ppb bicarbonate

EXAMPLE III

To illustrate the effects the drilling fluid of the present invention has upon various shales in comparison to other drilling fluids, the following tests are performed to determine the inhibition of the various fluids upon the dispersion and swelling of clays.

TEST PROCEDURE

Shale samples are prepared by first separating cuttings from three different well return fluids. The cuttings are washed with several volumes of water, dried at 225° F. for approximately 24 hours, and then passed through a U.S. Sieve Series screen.

The sample is screened through 6 and 10 mesh screens for the dispersion test and a 10 gram sample is immersed in the test fluid and hot rolled at 150° F. for 16 hours. The sample then is filtered through 10 and 80 mesh screens. The residue left on each screen is dried, cooled and weighed to determine the percentage of clay which is dispersed.

The sample is screened through an 80 mesh screen for the swelling test and a 10 gram sample is pressed into a pellet under a pressure of 20,000 psi. The pellet then is mounted between two screens in a container and a strain gauge is attached to the sample and calibrated to zero. The container then is filled with the test fluid and the time is recorded together with the strain gauge readings. The gauge records linear swelling of the sample.

Linear swelling is converted to percent linear swelling by the formula:

$$E = l/L \times 100$$

where
- E = linear swelling in percent
- l = swelling (mm)
- L = sample height (mm)

The shale samples were subjected to x-ray diffraction analysis and found to have the composition set forth below:

| Shale Sample | Bentonite Shale | Gumbo Shale | Southwestern Texas Shale |
| --- | --- | --- | --- |
| Composition, % | 90–95 | 51–53 | 7–10 |
| Smectite and mixed layer clays | | | |
| quartz | | 22–24 | 8.5 |
| calcite | | 12–14 | 4.1 |
| pyrite | | 1–3 | — |
| illite | | 1–2 | 1–3 |
| kaolinite | | 4–6 | 2–4 |
| chlorite | | trace | — |
| feldspar | | 2–4 | 1–3 |
| amorphous | | — | 53–66 |
| BaSO$_4$ | | — | 14 |
| Cation Exchange Capacity (CEC), meq/100 grams | 55 | 22.5 | 3 |

The percent of dispersion inhibition is calculated as follows:

$$\% \text{ dispersion inhibition} = \frac{\text{sample dispersion in drilling fluid}}{\text{sample dispersion in water}} \times 100$$

The percentage of dispersion inhibition of the various drilling fluids on the shale samples tested is set forth below:

| | Inhibition of Dispersion of Clays in Shale Sample, % | |
| --- | --- | --- |
| Drilling Fluid | Gumbo Shale | Southwestern Texas Shale |
| 13 ppb NH$_4$Cl | 47.2 | 45.4 |
| 14.4 ppb NH$_4$Cl | 54.5 | 40.0 |
| Saturated NH$_4$Cl | 51.0 | — |
| 93 ppb NaCl | 65.3 | 60.0 |
| 13 ppb NH$_4$Cl + 93 ppb NaCl | 75.6 | 62.0 |
| 14.4 ppb NH$_4$Cl + 93 ppb NaCl | 76.9 | 63.0 |
| Drilling fluid of the present invention prepared as in Example 1 | 76.6 | 80.0 |

The percent of swelling inhibition is calculated as follows:

$$\% \text{ swelling inhibition} = \frac{\text{sample swelling in drilling fluid}}{\text{sample swelling in water}} \times 100$$

The percentage of swelling inhibition of the various drilling fluids on the shale samples tested is set forth below:

| | Inhibition of Swelling of Clays in Shale Sample % | | |
| --- | --- | --- | --- |
| Drilling Fluid | Bentonite Shale | Gumbo Shale | Southwestern Texas Shale |
| 13 ppb NH$_4$Cl | 71.4 | 65.7 | 16.8 |
| 14.4 ppb NH$_4$Cl | 73.6 | 67.1 | 17.1 |
| Saturated NH$_4$Cl | 87.4 | 77.0 | — |
| 93 ppb NaCl | 79.3 | 73.8 | — |
| 13 ppb NH4Cl + 93 ppb NaCl | 84.7 | 76.0 | 29.7 |
| 14.4 ppb NH4Cl + 93 ppb NaCl | 85.4 | 75.5 | 28.6 |
| Drilling fluid of the present invention prepared as in Example 1 | 85.4 | 71.5 | 22.1 |

The results of the inhibition tests clearly illustrate the effectiveness of the drilling fluid prepared in accordance with the method of the present invention in preventing clay dispersion and swelling in comparison to other drilling fluid compositions.

EXAMPLE IV

To illustrate the effect the drilling fluid of the present invention has upon a salt formation in comparison to other fluids, the following tests are performed to determine the inhibition of the fluids on salts.

TEST PROCEDURE

Equipment was designed and built to simulate a typical drilling fluid circulating in a well bore during a drilling operation. Simulation of the well bore in a salt dome is effected by packing the formation material in the lower portion of a metallic cell to a depth of 4.5 to 5 inches with the addition of a small amount of water. The metallic cell has a 2½ inch inside diameter. The cell then is heated for about 4 hours at 250° F. to form a hard solid mass. A 1-inch diameter hole is drilled in the center of the mass to simulate the well bore. A ¼-inch diameter copper tube is introduced into the center hole to a depth about ½-inch above the bottom of the hole. The tube represents the drill string in the well bore and the space around the tube the annulus through which the drilling fluid is circulated out of the well bore. A variable flow rate JABSCO pump was employed to circulate 1,250 milliliters of drilling fluid. The fluid moved down the tube and up the annulus to return to a reservoir for recirculation. The fluid was circulated at a rate of 1,650 milliliters per minute. The drilling fluid is heated to about 150° F., and the cell was maintained in a container under sufficient pressure to avoid evaporation of the water in the drilling fluid.

The following measurements were taken:

1. Weight of the metallic cell, ($W_1$), grams,
2. Weight of the cell and salt before exposure to drilling fluid, ($W_2$) grams.
3. Weight of the cell and salt after five hours of circulation of drilling fluid and four hours of drying at 250° F. to remove remaining drilling fluid, ($W_3$) grams.

Salt inhibition is inversely related to the salt formation erosion that occurs during circulation of the drilling fluid. The percentage of salt erosion is calculated as follows:

$$\% \text{ Erosion} = \frac{W_2 - W_3}{W_3 - W_1} \times 100$$

Two salt formations are employed. The first sample comprised 95-99 percent sodium chloride and 1 to 5 percent sodium sulfate. The second sample comprised Williston Basin salt formation from North Dakota. The Williston salt had the following X-ray diffraction analysis:

| Component | Percentage |
|---|---|
| NaCl | 62-66 |
| $SiO_2$ | 2-6 |
| $CaSO_4$ | 13-17 |
| $CaSO_4.2H_2O$ | 2-4 |
| $CaCl_3$ | 7-11 |
| $CaMg(CO_3)2$ | 3-7 |

The results of the tests are set forth below:

venting salt erosion in comparison to other aqueous fluids. The test employing diesel as the circulating fluid was performed to determine whether or not the erosion which occurred was the result of the solubility of the salt formation in the fluid or frictional erosion resulting from turbulence in the fluid caused by the equipment design. This test indicates that the erosion which occurs is the result of salt formation solubility in the drilling fluid.

While that which is considered to be the preferred embodiment of the present invention has been described herein, it is to be understood that modifications, changes or the like can be made in the method and composition disclosed without departing from the spirit or scope of the invention as defined in the appended claims.

What is claimed is:

1. A method of preparing a shale and salt formation stabilizing clay-based drilling fluid comprising:
    admixing a predetermined quantity of ammonium chloride with an aqueous fluid, said ammonium chloride being present in an amount of from about 10 to about 70 pounds per barrel of drilling fluid;
    admixing a predetermined amount of sodium chloride with the aqueous ammonium chloride solution to form an aqueous ammonium chloride-sodium chloride solution, said sodium chloride being present in an amount of from about 65 to about 150 pounds per barrel of drilling fluid; and
    admixing a predetermined quantity of a viscosifying agent comprising a clay with the aqueous ammonium chloride-sodium chloride solution to form a clay-based drilling fluid whereby the occurrence of a substantial viscosity hump during said admixing is prevented.

2. The method of claim 1 defined further to include the step of:
    admixing a fluid-loss reducer with the admixture of clay and aqueous ammonium chloride and sodium chloride.

3. The method of claim 1 defined further to include the steps of:
    admixing a pH-control agent with the admixture of

| INHIBITION EFFECT OF DRILLING FLUIDS | | | | | | | | |
|---|---|---|---|---|---|---|---|---|
| Test Fluid | Formation | $W_1$, g. | $W_2$, g. | $W_3$, g. | Weight of Salt, g. | Weight of Eroded Salt, g. | % Erosion | % Inhibition |
| 1. Water | NaCl | — | — | — | — | — | about 80 | — |
| 2. Saturated $NH_4Cl$ brine | NaCl | 2,745 | 3,267 | 3,064 | 522 | 203 | 38.9 | 61.1 |
| 3. Fluid prepared in accordance with Test 2, Example 1 | NaCl | 2,753 | 3,267 | 3,158 | 514 | 109 | 21.2 | 78.8 |
| 4. Fluid prepared in accordance with Test 2, Example 1, however, NaCl increased to 131 | NaCl | 2,782 | 3,298 | 3,284 | 516 | 14 | 2.7 | 97.3 |
| 5. Fluid prepared in accordance with Test 2, Example 1 | Williston Salt | 2,851 | 3,329 | 3,175 | 478 | 154 | 32.2 | 67.8 |
| 6. Fluid prepared in accordance with Test 2, Example 1, however, NaCl increased to 131 | Williston Salt | 2,778 | 3,260 | 3,237 | 482 | 23 | 4.8 | 95.2 |
| 7. Diesel | NaCl | 2,764 | 3,476 | 3,478 | 712[1] | 2 | 0.3 | 99.7 |

[1]Sample wetted with diesel

The results of the above tests clearly illustrate the effectiveness of the drilling fluid prepared in accordance with the method of the present invention in preventing salt erosion in comparison to other aqueous fluids.

clay and aqueous ammonium chloride and sodium chloride and adjusting the pH of said solution to a level in the range of from about 5 to about 9 by the addition of a pH-adjusting agent to said solution.

4. The method of claim 1 defined further to include the step of:

admixing a predetermined quantity of a weighting agent with the admixture of clay and aqueous ammonium chloride and sodium chloride to form a clay-based drilling fluid having a weight in the range of from about 8.5 to about 18 pounds per gallon.

5. A method of preparing a clay-based drilling fluid comprising:

admixing from about 10 to about 70 ppb of ammonium chloride with an aqueous fluid until the ammonium chloride substantially is dissolved;

admixing from about 65 to about 150 ppb of sodium chloride with the aqueous ammonium chloride solution until a substantial portion of the sodium chloride is dissolved;

admixing from about 5 to about 30 ppb of a viscosifying agent comprising a clay with the aqueous ammonium chloride-sodium chloride solution whereby the occurrence of a substantial viscosity hump during said admixing is avoided; and, adjusting the pH of the aqueous fluid to a level in the range of from about 5 to about 9 by the addition of a quantity of a pH-adjusting agent to form a clay-based drilling fluid capable of stabilizing shale and salt formations during drilling operations.

6. The method of claim 5 defined further to include the step of:

admixing a pH-control agent comprising ferrous gluconate with the admixture of clay and aqueous ammonium chloride-sodium chloride solution prior to admixing with the pH-adjusting agent.

7. The method of claim 5 defined further to include the step of:

admixing a weight agent with the clay-based drilling fluid in an amount sufficient to provide a weight of from about 8.5 to about 18 pounds per gallon.

* * * * *

UNITED STATES PATENT AND TRADEMARK OFFICE
CERTIFICATE OF CORRECTION

PATENT NO. : 4,526,693
DATED : 07/02/85
INVENTOR(S) : Son et al

It is certified that error appears in the above-identified patent and that said Letters Patent is hereby corrected as shown below:

Column 4, line 34 which reads

"10 sec.,#/100 $ft^2$     1     6"

should read

--10 sec., #/100$ft^2$     6     1--

Signed and Sealed this

First Day of October 1985

[SEAL]

Attest:

Attesting Officer

DONALD J. QUIGG

Commissioner of Patents and
Trademarks—Designate